(12) United States Patent
Young

(10) Patent No.: US 10,363,654 B2
(45) Date of Patent: Jul. 30, 2019

(54) TOOL ORGANIZER AND METHOD OF MAKING THE SAME

(71) Applicant: Melinda Young, Long Beach, CA (US)

(72) Inventor: Melinda Young, Long Beach, CA (US)

(*) Notice: Subject to any disclaimer, the term of this patent is extended or adjusted under 35 U.S.C. 154(b) by 661 days.

(21) Appl. No.: 14/995,369

(22) Filed: Jan. 14, 2016

(65) Prior Publication Data

US 2016/0129583 A1 May 12, 2016

Related U.S. Application Data

(62) Division of application No. 14/077,122, filed on Nov. 11, 2013.

(51) Int. Cl.
*B25H 3/06* (2006.01)
*B29L 9/00* (2006.01)
*B29C 43/02* (2006.01)
*B29C 65/56* (2006.01)
*B29K 301/10* (2006.01)
*B29L 31/00* (2006.01)
(Continued)

(52) U.S. Cl.
CPC ............ *B25H 3/06* (2013.01); *B29C 43/021* (2013.01); *B29C 65/565* (2013.01); *B29C 2043/3613* (2013.01); *B29C 2043/3639* (2013.01); *B29K 2105/04* (2013.01); *B29K 2261/04* (2013.01); *B29K 2301/10* (2013.01); *B29L 2009/00* (2013.01); *B29L 2031/772* (2013.01); *Y10T 156/1002* (2015.01)

(58) Field of Classification Search
CPC ....... B25H 3/06; B29C 43/021; B29C 54/454; B29C 2043/3613; B29C 2043/3639; Y10T 156/1002; B29L 2031/772; B29K 2301/10
See application file for complete search history.

(56) References Cited

U.S. PATENT DOCUMENTS 1,877,686 A * 9/1932 Penkoski ................. B25D 3/00
30/167.1
2,983,297 A * 5/1961 Wilson .................. B25D 1/045
254/26 R
(Continued)

OTHER PUBLICATIONS

Copenheaver, Blaine R., PCT International Search Report, dated Feb. 18, 2015, pp. 1-7.
(Continued)

*Primary Examiner* — Jacob J Cigna
*Assistant Examiner* — Lee A Holly
(74) *Attorney, Agent, or Firm* — Klein, O'Neill & Singh, LLP

(57) ABSTRACT

A tool organizer and method of making the same is provided which allows a user to quickly and easily store tools and other items of various sizes, shapes and configurations. The customizable organizer includes a depressible core capable of maintaining an impression of an object that is pressed into it. The organizer also includes a covering material such as a fabric, flock or elastomeric coating, which protects the outer surface of the core, and also provides an aesthetically pleasing appearance. A tacky adhesive is applied on an upper surface of the core so that when a tool or other item is pressed into the covering material that overlay the core, the tacky adhesive maintains the covering material in close conformity to the customized impression of the tool or other item created in the organizer.

5 Claims, 5 Drawing Sheets

(51) Int. Cl.
    *B29C 43/36*     (2006.01)
    *B29K 105/04*    (2006.01)
    *B29K 261/04*    (2006.01)

(56) References Cited

U.S. PATENT DOCUMENTS

| | | | |
|---|---|---|---|
| 3,406,234 | A | 10/1968 | Bailly |
| 4,964,514 | A | 10/1990 | Wycech |
| 5,320,223 | A | 6/1994 | Allen |
| 5,855,833 | A * | 1/1999 | Stanley .............. B29C 43/021 264/129 |
| 6,106,920 | A * | 8/2000 | Pichon .................. B05D 1/14 428/90 |
| 6,632,162 | B1 | 10/2003 | Wilkinson |
| 2003/0146123 | A1* | 8/2003 | Michael ................ B25H 3/06 206/373 |
| 2009/0218741 | A1* | 9/2009 | Winnard ................ B25H 3/06 269/8 |
| 2011/0089072 | A1* | 4/2011 | Gillam ............... B65D 81/113 206/523 |
| 2012/0037537 | A1 | 2/2012 | Schein et al. |
| 2015/0129443 | A1 | 5/2015 | Young |

OTHER PUBLICATIONS

Clayart—Tool Holders Discussion thread (online). Deb Thuman. Mar. 4, 2007 (retrieved on Jan. 13, 2015). Retrieved from the internet <URL: http://www.potters.org/subject99390.htm>.

Mad Modder—Pamper your tools in a cosy drawer space! Discussion thread (online). John Hill. Apr. 12, 2011 (retrieved on Jan. 11, 2015). Retrieved from the internet: <URL: http://madmodder.net/index.php?topic=4770.0>.

Titan 11061 Mini Magnetic Parts Tray. Amazon.com product advertisement (online). Titan. Sep. 26, 2011 (retrieved on Jan. 12, 2015). Retrieved from the internet URL: <http://www.amazon.com/Titan-11061-Mini-Magnetic-Parts/dp/B000HYL20G>.

Craft Test Dummies Craft Product Review: "The Best Glue Ever" by Scraperfect. Product review (online). Craft Test Dummies. Dec. 1, 2010 (retrieved on Jan. 12, 2015). Retrieved from the internet: URL: <http://www.craftestdumies.com/craft-product/reviews/craft-product-review-the-best-glue-ever-by-scraperfect/>.

Oasis Floral Products, Sahara II Dry Foam Superbrick. Retrieved from the internet: URL: <http://oasisfloralproducts.com/e2wItemMain.aspx?parentId=72439>.

Gerard, Olivier, Supplementary European Search Report, dated Jun. 14, 2017.

* cited by examiner

TOOL ORGANIZER AND METHOD OF MAKING THE SAME

CROSS-REFERENCE TO RELATED APPLICATIONS

The present application is a divisional patent application of U.S. patent application Ser. No. 14/077,122, filed on Nov. 11, 2013, the entire contents of which are incorporated herein by reference.

STATEMENT RE: FEDERALLY SPONSORED RESEARCH/DEVELOPMENT

Not Applicable

BACKGROUND

The embodiments and aspects disclosed herein relate to a tool organizer.

Although tool kits may be sold with various organizing trays to meet the specific needs of the kit, customizing organizers to accommodate tools of various shapes, sizes, and configurations, which a user already owns, can be tedious, time consuming, and unsightly.

Accordingly, there is a need in the art for an improved tool organizer.

BRIEF SUMMARY

A customizable organizer is provided that may be used for applications on shelves, in boxes or drawers, or any other area where a user has a need to maintain tools and other items of various sizes, shapes, and configurations in an organized manner.

The organizer has a depressible core that is capable of maintaining an impression of an object that is pressed into it. The organizer also includes a stretchy covering material such as a fabric, flock or elastomeric coating, which protects the outer surface of the core, and also provides an aesthetically pleasing appearance. A tacky adhesive is applied on an upper surface of the core so that when a tool or other item is pressed into the covering material that overlay the core, the tacky adhesive maintains the covering material in close conformity to the customized impression of the tool or other item created in the depressible core.

More particularly, the depressible core may be a dry foam, a low density non-drying clay, or any other material capable of maintaining a depressed region shaped to an outer periphery of a tool or other item to be stored.

The organizer may also include a base, which may be stiffer than the core, so that it may provide support along a lower surface of the core to prevent the core from breaking and other damage. Furthermore, a sealing adhesive may be applied to the base to maintain a portion of the covering material which is wrapped under the core, as well as maintaining attachment of the base to the lower surface of the core. It is further contemplated that magnets may be adhered to the base or between the base and the core so that the organizer may be prevented from sliding within or on a metallic surface.

A method of making a customizable organizer is also provided. Steps for the method include providing a depressible core, sizing the core to fit within a drawer, box, tray or on any other surface as needed by a user; coating an upper surface of the core with an adhesive that remains sticky after drying, and disposing a stretchy covering material such as a fabric, flock or elastomeric coating on the upper surface of the core. The method may also include securing a portion of the covering material between a lower surface of the core and an upper portion of a protective base which may be sized to conform to the dimensions of the lower surface of the core.

In operation, a user will be able to arrange one or more tools or other items which he or she wishes to store in an organized manner on the upper surface of the core. Then he or she may press each tool or other item by hand or, to achieve greater force and precisely defined impressions, tap each tool or other item using a hammer into the upper surface of the core until a suitable impression of the tool or other item is achieved.

Thus, a customizable organizer which does not require any special devices for heating, cooling or cutting, may be achieved. Creating such organizers is faster and easier than previous methods, and therefore suitable to the unique needs of a user.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
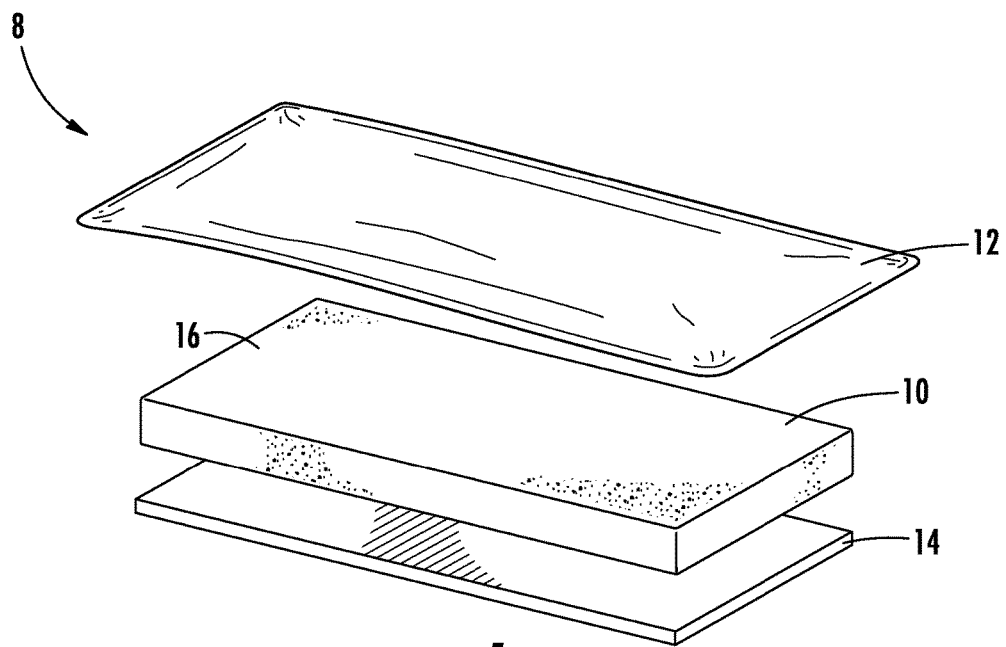
FIG. 1 is an exploded perspective view of the tool organizer.

Referring now to the drawings, a customizable organizer 8 may include a depressible core 10, a covering material 12 and a base 14. The depressible core 10 is deformable by pressing a tool into the exterior surface of the core. Once deformed, an impression defining an outer periphery of the tool remains so that the tool can be put into the depressed region for storage and removed when needed for use. The core 10 is covered with a covering material 12 which is adhered to the core 10. In this manner, when the depression is made in the core 10, the adhesive forces the covering material to assume the shape of the depression. The base 14 is a hard backing attached to a bottom side of the core 10.

Figure 2:
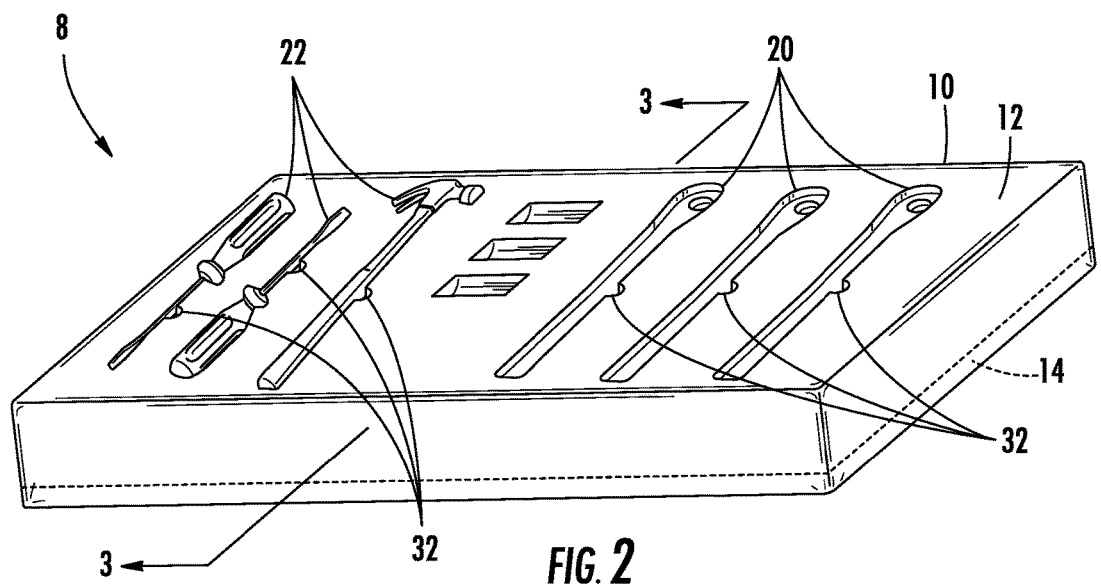
FIG. 2 is a perspective view of an assembled tool organizer.

FIG. 2 shows the tool organizer 8 with customized impressions 20 along an upper surface of the core 10 as well as a tool 22 placed within a customized space. The tool organizer has a depressible core 10 sized to fit in a drawer, box, or any other surface or container as desired by a user. The core 10 may have no elastic memory. In other words, it may permanently maintain the impression 20 of the tool 22 or item which it has been customized to receive.

Figure 3A:
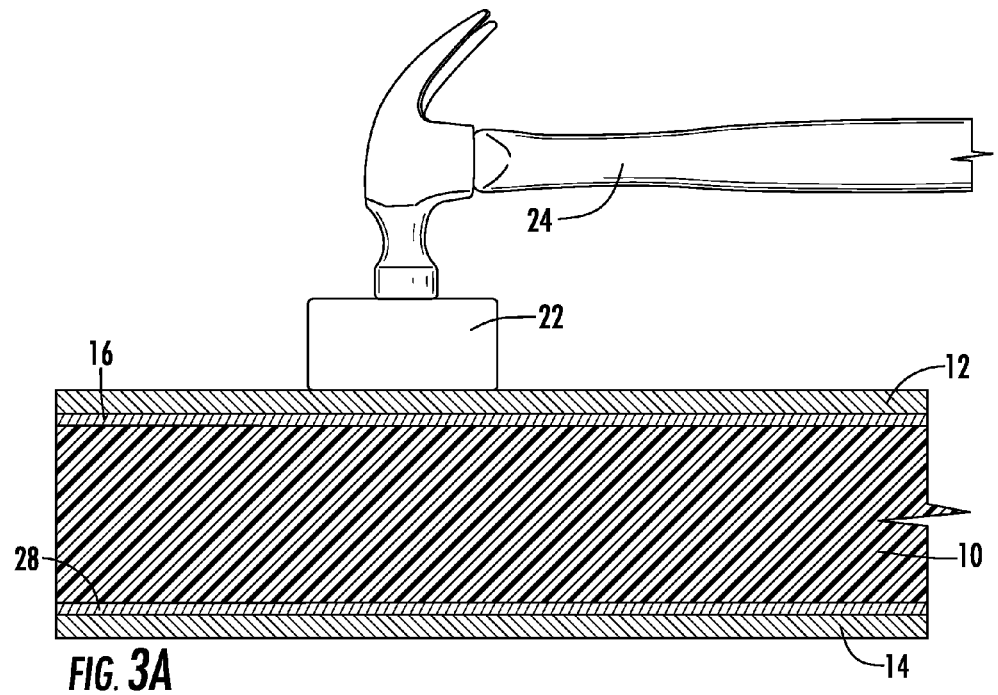
FIG. 3A is a cross-sectional view of the tool organizer of FIG. 2.
Figure 3B:
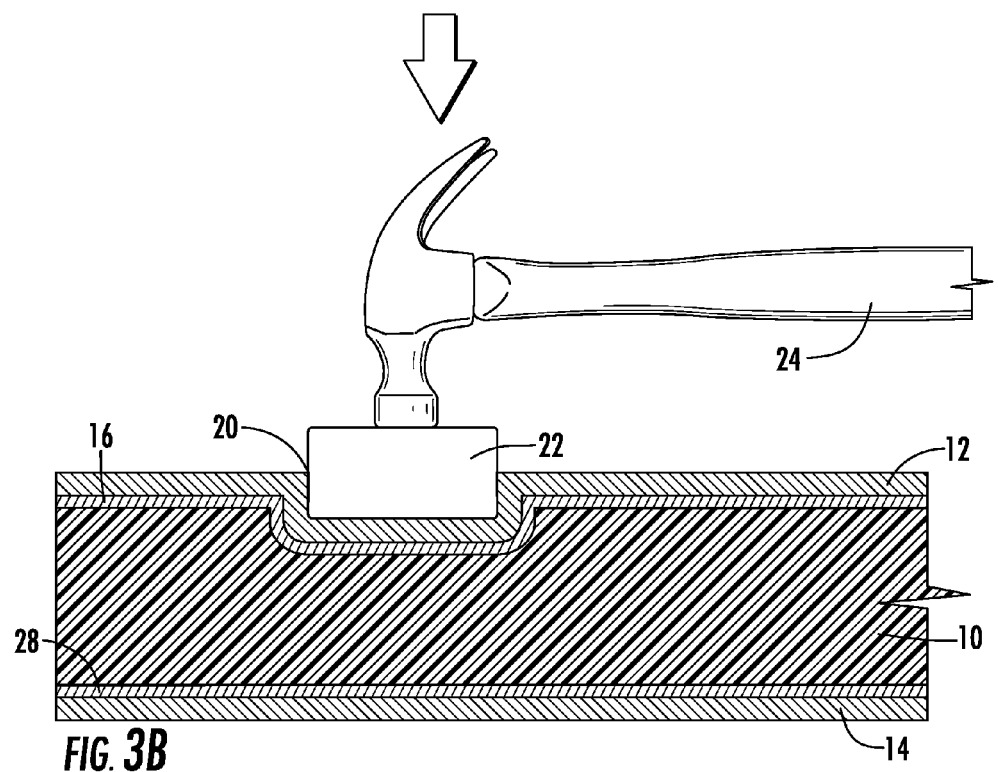
FIG. 3B is a cross-sectional view of the tool organizer after forming a depression sized and configured to fit a tool.

Referring to FIGS. 3A and 3B, in order to customize the organizer, a tool 22 may be pressed or tapped into an upper surface of the tool organizer 8 by hand or with a hammer 24. In particular, the tool 22 is laid on top of the covering material 12. The user's hand or a hammer 24 may be used to press or tap the tool 22 so as to form a depressed region configured to the outer periphery of the tool 22. The core 10 forms a depression. The covering material 12 retains the shape of the deformation in the core 10 because of the tacky adhesive. This pressing or tapping action creates an impression 20 of the tool or other item being pressed or tapped into the core, and the covering material 12 maintains conformity with the impression 20.

The core 10 may comprise any material that is sturdy enough to receive an impression 20 of the tool 22 to be stored while also displaying minimal crushing, or bedding, that might occur to the core material underlying its upper surface. The core 10 may be fabricated from a type of depressible dry foam. One such depressible foam may be an open cell, low density phenolic foam. Such foams are commonly used in the fields of orthopedic foot print cast making, floral arrangement, and insulation. In one embodiment, the core 10 may comprise Sahara II dry floral foam sold under the trademark OASIS®. In another embodiment, the core 10 may comprise Impression Foam sold under the trademark BIO-FOAM®. In yet another embodiment, the depressible core 10 may be low-density, nondrying clay.

The covering material 12 protects the outer surface of the core 10. The core 10 may also provide an aesthetically pleasing, finished appearance for the organizer 8. The covering material 12 may be stretchy with low elastic memory. In other words, the covering material 12 may retain a shape in conformity with a depression formed in the core 10. The covering material 12 has a sufficiently low elastic memory so that the elasticity of the covering material 12 does not break the adhesive bond between the covering material 12 and the core 10 so as to delaminate the covering material 12 and the core 10. The covering material 12 may be a fabric, flock, elastomeric coating, or any other material that will stretch and conform to the shape of the core 10 when impressions 20 of tools 22 or other items are made in its surface. For example, in one embodiment, the covering material 12 may be a blended fabric composed of cotton and spandex. The blended fabric may be about 90 to about 99% cotton and about 1 to about 10% spandex. Preferably, the blended fabric is 95% cotton and 5% spandex. Other materials for the covering material 12 are also contemplated. By way of example and not limitation, the covering material 12 may be nylon, rayon, or polyester monofilament fibers applied to the core 10 in a flocking process.

In order to ensure that the covering material 12 conforms to the shape of the core 10, and more importantly to the impressions 20 defining outer peripheries of the tools 22 or items for storage, a tacky adhesive 16 that remains sticky and flexible after drying may be applied on an upper surface of the core. A tacky adhesive 16 that remains sticky and flexible after drying ensures that when impressions 20 are made, the covering material 12 will continue to be maintained in close conformity to each impression 20 even over a long period of time. In other words, when a tool 22 or other item is pressed into the covering material 12 that overlay the core 10, the tacky adhesive 16 maintains the covering material 12 in close conformity to the customized impression 20 of the tool 22 or other item created in the organizer.

One such tacky adhesive 26 is the product Repositionable Tacky Spray sold under the trademark Aleene's®. Another such tacky adhesive 26 may be the product Best Glue Ever sold under the nonproprietary trade name ScraPerfect. However, it is contemplated that any adhesive which can be applied in a layer across the upper surface of the core 10 and which may remain permanently sticky and flexible after drying may be used.

The covering material 12 may be disposed over the tacky adhesive 16 coating the upper surface of the core 10 and trimmed so that it will neatly fold over the side of the core 10 to a lower surface of the core 10. Applied in this manner, the covering material 12 may be able to protect the surface of the core 10 from damage, and further provides an aesthetically pleasing look for the organizer 8.

Furthermore, the covering material 12 may be sufficiently impermeable to air so that it covers the upper surface of the core 10 but also protects the tacky adhesive 16 from exposure to an amount of air that will cause it to completely dry. It is further contemplated that a covering material 12 which has sufficient air permeability to allow the tacky adhesive 16 to cure completely over a period of time may be used. In such an embodiment, this allows a user to customize the organizer to meet his or her storage needs within a set period of time but after the tacky adhesive has completely dried, the dried tacky adhesive may provide a protective barrier to protect core 10 from unwanted impressions if a tool is accidentally dropped onto the top of the organizer 8.

The organizer may further include a durable base 14 which may be a sheet of supportive material sized to conform to the dimensions of the lower surface of the core 10. The base 14 may be a sheet of supporting material that may provide additional protection to the core 10 along the lower surface. The base 14 may be a sheet or tray of vinyl, plastic, or wood or any other material capable of providing support and protection along a lower surface of the core. Furthermore, it may also serve to secure a portion of the covering material 12 which is wrapped under the core 10.

The base 14 may be permanently attached to the lower surface of the core 10 by a sealing adhesive 28. A sealing adhesive 28 is any adhesive which provides a bond sufficient to permanently attach the lower surface of the core 10 to an upper surface of the base 14. The sealing adhesive may also serve to permanently adhere a portion of the covering material 12 securely between the base 14 and core 10. Other embodiments securing the base 14 and covering material 12 to the lower surface of the core are also contemplated. For example, the base 14 and covering material 12 may be secured to the core 10 using staples, pins or a dry-bonding sheet adhesive such as double sided tape.

The sealing adhesive 28 or other securing element may be spread onto an upper surface of the base 14 as well as on the portion of the covering material 12 which wraps around a lower surface of the core 10. Applied in this manner, the sealing adhesive may bond the upper side of the base 14 to the lower surface of the core 10, securing a portion of the covering material 12 permanently between them.

Figure 6:
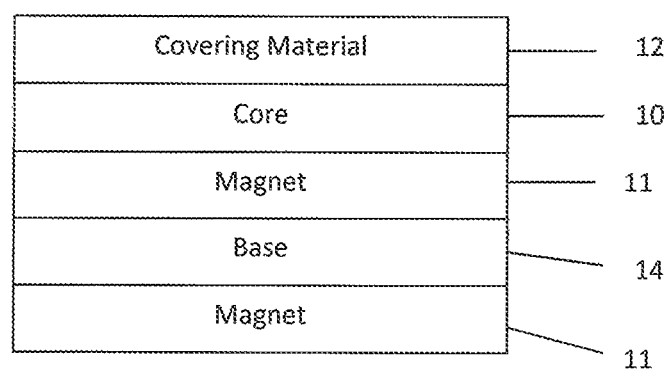
FIG. 6 is a schematic diagram of the organizer.

Referring now to FIG. 6, it is further contemplated that one or more magnets 11 may be adhered to the lower surface of the base 14 so that the organizer may be prevented from sliding within or on a metallic surface comprising the tray, box, drawer or other surface were a user decides to use the organizer. In one embodiment for example, the one or more magnets 11 may be cut from an adhesive magnetic strip and applied to the base 14. In another embodiment, the one or more magnets 11 may be circular dowling magnets 11 which a user may adhere in any number or configuration as desired on the lower surface of the base 14. It is also contemplated that the magnets 11 may be embedded to the lower surface of the core 10 and covered by the base 14.

It is further contemplated that the organizer may also include a grip tool 30, which when pressed into the core 10, may create a concave impression defining a space or spaces 32 contiguous to a customized impression 20 of a tool 22 or item as needed to facilitate ready removal of the tool 22 or item from its customized space within the organizer 8. In one embodiment, the grip tool 30 may be a dowel. The dowel may have a diameter of about one to about two inches. In another embodiment, the grip tool 30 may be a hemispherical cylinder. It is contemplated, however, that the grip tool 30 may be any shape or size which will create a depression in the depressible core 10 which will accommodate a human thumb, other finger, or other object so as to aid removal of each tool 22 or item from its customized impression 20 on the organizer 8.

The grip tool may comprise wood, plastic, or any other durable material that capable of withstanding the pressure of tapping or pressing by hand or by hammer to form an impression of it on the depressible core 10.

Figure 4:
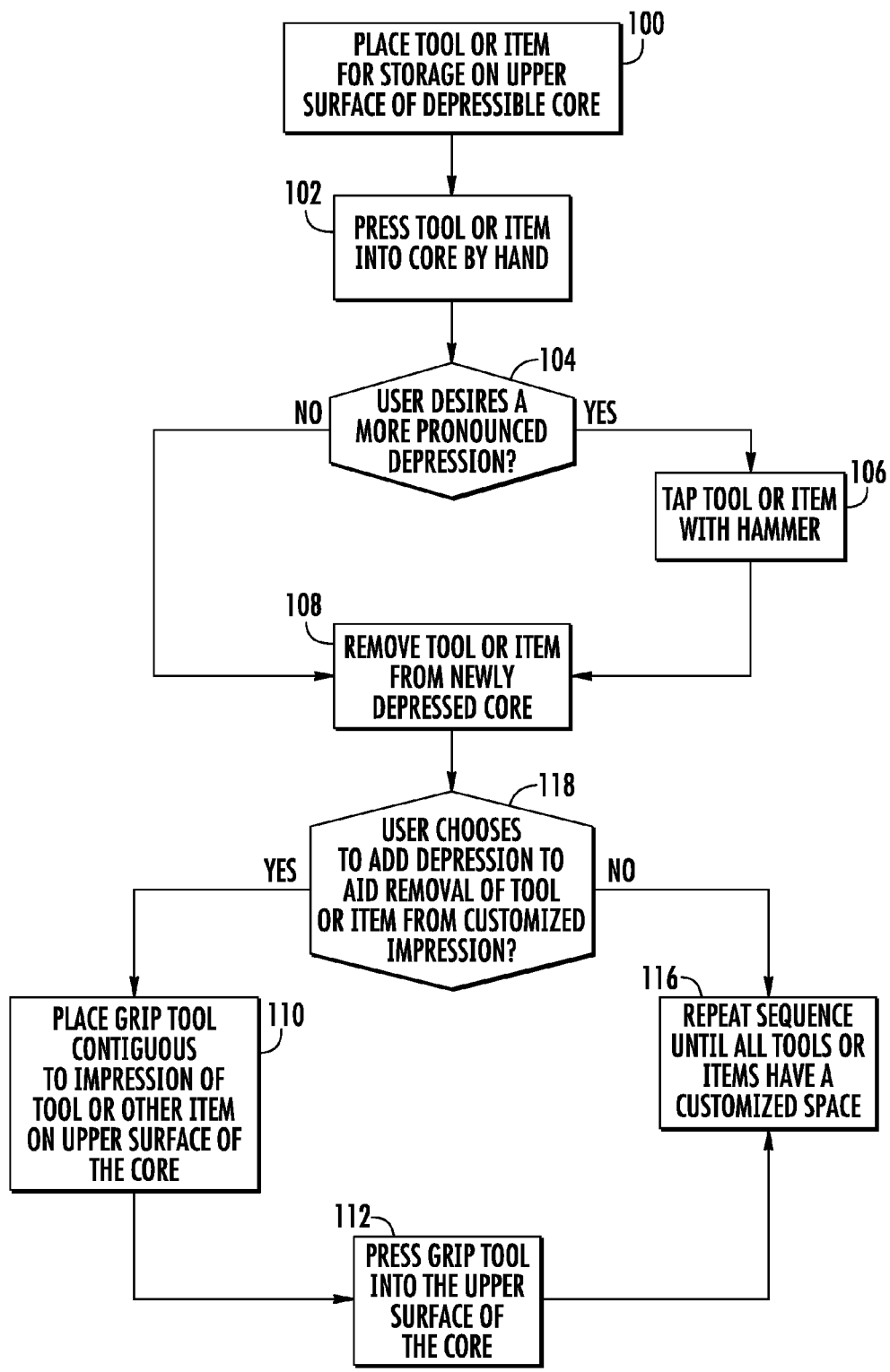
FIG. 4 is a method of customizing a tool organizer.

Referring now to FIG. 4, a flow chart for setting up the organizer 8 is shown. Initially, the organizer 8 may be provided to a user. The user then places 100 the tools 22 or items to be stored on the organizer 8 on the upper surface of the covering material to set the layout of the depressions to be formed in the organizer 8. Then the user may press 102 each tool 22 or other item into the core 10 by hand to form the depression in the core 10. If desired, the user may tap 106 the tool 22 or other item with the hammer 24 to make the depression more pronounced. The user then removes 108 the tool 22 from the core 10 to inspect the depression.

To aid removal of each tool 22 or other item from its depressed region, the user may use a grip tool 30 to create an impression 32 contiguous to each customized impression 20 of each tool 22 or item for storage. The user may remove 108 the tool 22 or item from its customized impression 20 in the core 10. Then the user places 110 the grip tool 30 on the core 10, contiguous to the impression 20 of the tool. The user then presses 112 the grip tool 30 into the core 10 by hand or with a hammer 24. The user repeats 116 the sequence above until all tools or items have a customized space or depression.

Figure 5:
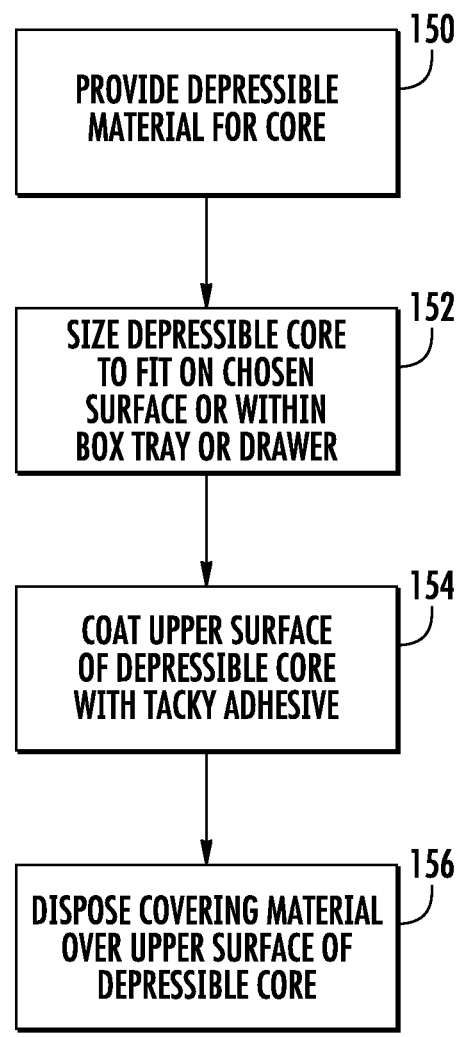
FIG. 5 is a method of manufacturing a tool organizer.

Referring now to FIG. 5, a flowchart for manufacturing the organizer 8 is shown. In particular, the depressible core 10 may be provided 150. The depressible core 10 is sized 152 to fit on a chosen surface or within a box, tray or drawer. The upper surface of the core 10 may be coated 154 with the tacky adhesive. The covering material 12 may then be disposed 156 over the upper surface of the coated depressible core 10.

The above description is given by way of example, and not limitation. Given the above disclosure, one skilled in the art could devise variations that are within the scope and spirit of the invention disclosed herein, including various ways of protecting and supporting the depressible core. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of making an organizer for maintaining one or more items, the method comprising the following steps:
    providing a depressible core having a flat upper surface and a lower surface wherein the upper surface of the depressible core maintains a depressed shaped of a depression after the depression is formed in the depressible core by the one or more items;
    coating the flat upper surface of the core with a tacky adhesive while the upper surface is flat,
    disposing a sheet of stretchy fabric covering material when the upper surface of the depressible core is flat so that when one or more items is placed on the sheet of stretchy fabric covering material and the one or more items are pressed or tapped into the stretchy fabric cover covering material, the depressible core and the stretchy fabric covering material simultaneously forms the depression in the upper surface of the depressible core and shapes the sheet of stretchy fabric covering material into a shape of the one or more items.

2. The method of making an organizer as defined in claim 1, further comprising sizing a base having a top surface and a bottom surface to conform to the dimensions of the lower surface of the core, and attaching the base to the lower surface of the core.

3. The method of making an organizer as defined in claim 2, wherein the base material comprises wood, plastic, or vinyl.

4. The method of making an organizer as defined in claim 2, further comprising attaching one or more magnets between the base and the core.

5. The method of making an organizer as defined in claim 1, wherein a portion of the stretchy fabric covering material is maintained between the base and lower surface of the core.

* * * * *